United States Patent [19]

Laubmann

[11] Patent Number: 5,248,955

[45] Date of Patent: Sep. 28, 1993

[54] CIRCUIT ARRAGEMENT FOR COMPENSATION FOR THE INFLUENCE OF TEMPERATURE ON COIL QUALITY

[75] Inventor: Robert Laubmann, Schwandorf, Fed. Rep. of Germany

[73] Assignee: Siemens Aktiengesellschaft, Munich, Fed. Rep. of Germany

[21] Appl. No.: 904,701

[22] Filed: Jun. 25, 1992

[30] Foreign Application Priority Data

Jun. 28, 1991 [EP] European Pat. Off. ........ 91110766.2

[51] Int. Cl.[5] .............................................. H01C 7/06
[52] U.S. Cl. .................................... 338/10; 338/22 R
[58] Field of Search ................ 338/10, 22 R; 315/46; 324/207.12; 73/861.12, 862.36; 361/140; 336/136

[56] References Cited

U.S. PATENT DOCUMENTS

| 381,304 | 4/1888 | Weston | 338/10 |
|---|---|---|---|
| 3,694,785 | 9/1972 | Chass | 336/136 |
| 4,117,371 | 9/1978 | Van Vliet et al. | 315/46 |
| 4,236,410 | 12/1980 | Appel et al. | 73/861.12 |
| 4,989,460 | 2/1991 | Mizuno et al. | 73/862.36 |
| 5,043,661 | 8/1991 | Dobey | 324/207.12 |
| 5,089,930 | 2/1992 | Chass | 361/140 |

Primary Examiner—Marvin M. Lateef
Attorney, Agent, or Firm—Kenyon & Kenyon

[57] ABSTRACT

In many cases, the influence of temperature on the quality of a coil has a disturbing effect. Therefore, a coil inductance is produced such that the influence of temperature on the quality of the coil is substantially compensated for in a particular range of the system frequency. To this end, a second coil having a second quality value Q2 is magnetically coupled in series to a first coil having a first quality value Q1. Moreover, the two coils are selected in such a way that for a particular range of the system frequency f, the quality value Q1 decreases as the temperature T increases and the quality value Q2 increases as the temperature T increases. A coil conductor for the first coil made of litz wire and a coil conductor for the second coil made of solid wire may be used to create such a temperature dependence.

6 Claims, 2 Drawing Sheets

CIRCUIT ARRAGEMENT FOR COMPENSATION FOR THE INFLUENCE OF TEMPERATURE ON COIL QUALITY

BACKGROUND OF THE INVENTION

The present invention relates to a circuit arrangement having a first coil with a first inductor and a first ohmic resistor made of a first coil conductor.

These types of circuit arrangements are used to produce an inductance. However, typically a temperature dependence of the first ohmic resistor also results in an undesirable temperature sensitivity of a quality of the circuit. The quality represents a relationship between the inductive reactance at a predetermined system frequency and the first ohmic resistor. This dependency on temperature becomes noticeable in many applications as a disturbing side effect that is advantageous to remove or at least to minimize. For example, if the temperature dependence results in the quality of a resonating circuit also varying with temperature, then in response to the same sudden excitation of the resonating circuit, completely different transient characteristics can result for different temperature levels.

SUMMARY OF THE INVENTION

Therefore, it is beneficial to provide a circuit arrangement with a coil inductance such that the influence of temperature on the quality is substantially compensated for in a particular system frequency range. This task is solved according to the present invention by additionally connecting to the first coil in series therewith a second coil having a second inductor and a second ohmic resistor made of a second coil conductor. The two coils are magnetically coupled together and are selected so that for a particular system frequency range, the temperature dependence of the quality values Q1 and Q2 for the first and second coils correspond to one another such that the quality value Q1 for the first coil decreases as the temperature increases and the quality value Q2 for the second coil increases as the temperature increases. A further embodiment of the present invention provides for the first coil conductor to consist of litz wire (i.e. stranded or flexible wire) and the second coil conductor to consist of solid wire.

BRIEF DESCRIPTION OF DRAWINGS

Other features and advantages of the present invention will become apparent from the following description taken in conjunction with the accompanying drawings, wherein.

DETAILED DESCRIPTION

Figure 1:
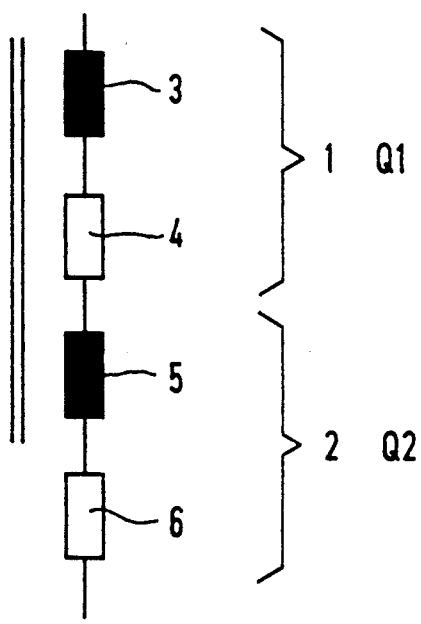
FIG. 1, illustrates a circuit arrangement of two series-connected, magnetically coupled coils according to an embodiment of the present invention.

FIG. 1 illustrates an equivalent circuit diagram of two serially connected coils 1, 2, which are magnetically coupled according to an embodiment of the present invention. The first coil 1 has a first inductor 3 and a first ohmic resistor 4 which is made of a first coil conductor. The second coil 2 has a second inductor 5 and a second ohmic resistor 6 which is made of a second coil conductor. A litz wire (i.e., stranded or flexible wire) is used as the coil conductor for the first coil 1 and a solid wire is used as the coil conductor for the second coil 2.

Figure 2:
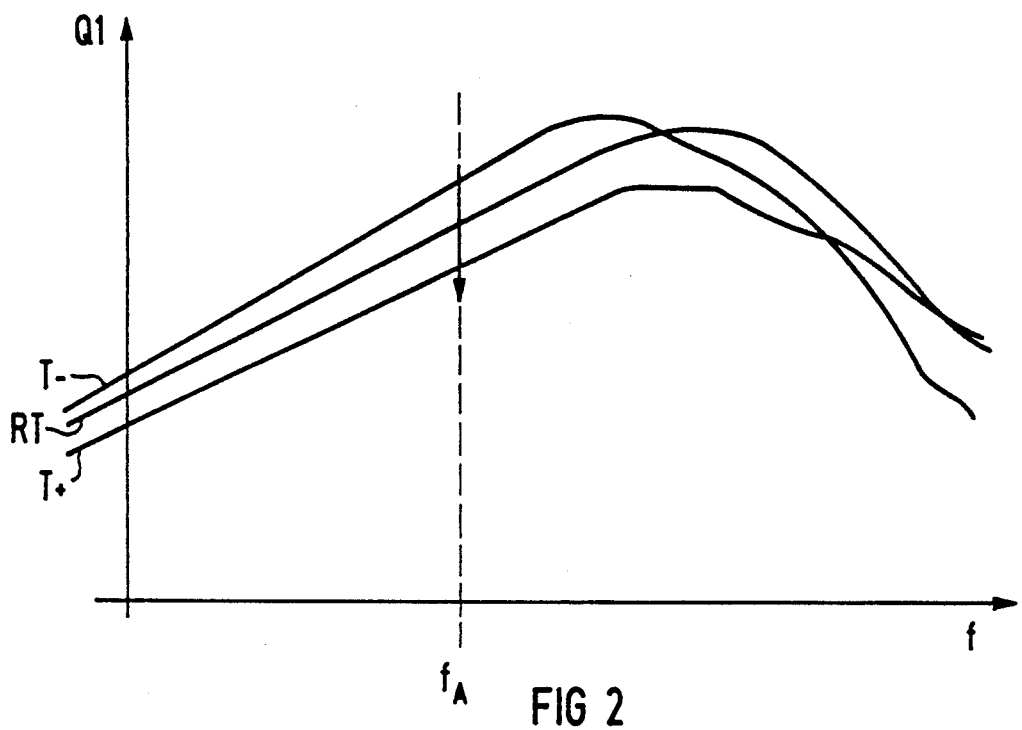
FIG. 2 illustrates a diagram of quality characteristic curves for various temperatures in dependence upon the system frequency for a coil conductor consisting of litz wire (i.e., stranded or flexible wire)
Figure 3:
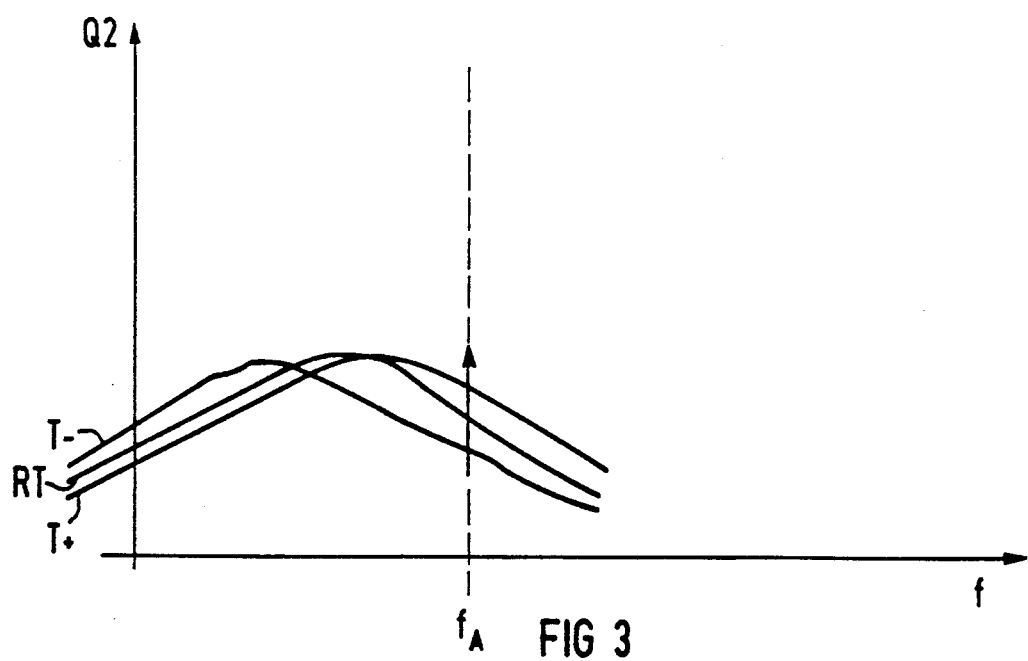
FIG. 3 illustrates a diagram of quality characteristic curves for various temperatures in dependence upon the system frequency for a coil conductor consisting of a solid wire.

FIGS. 2 and 3 show that the quality of the circuit illustrated in FIG. 1 increases with rising system frequency f up to a maximum value, and then falls off due to an increase in coil losses. The value of the maximum is dependent upon the configuration of the coil. In the same way, in some coil configurations, the temperature curve is inverted above the maximum.

The relationship between a quality value Q1 of the first coil relative to the system frequency f is illustrated for three different temperatures T relating to three different curves in FIG. 2. In FIG. 2, the three curves are shown for different temperatures T, whereby for a specific system frequency $f_4$, an arrow pointing downward indicates that with an increasing temperature T, the quality value Q1 of the stranded or flexible wire decreases. Corresponding quality value curves for the quality values Q2 of solid wire are illustrated in FIG. 3. A temperature dependence of the quality value Q2 at the system frequency $f_4$ for solid wire is illustrated in FIG. 3. When there is an increase in temperature, as indicated here by the arrow pointing upwards, the quality value Q2 of the second coil 2 is also enhanced.

The decline in the quality value Q1 can be compensated for at least partially by the simultaneous increase in the quality value Q2 of the second coil 2 in a series circuit including the first coil 1 of litz wire and the second coil 2 of solid wire. In this arrangement, the entire ohmic resistance is made up of the series connection of the first ohmic resistor 4 and the second ohmic resistor 6. As a result of the magnetic coupling of the two coils 1, 2, the inductance of the entire circuit arrangement increases disproportionally, while the ohmic resistance increases linearly. Thus, for the entire circuit arrangement consisting of the two series-connected coils 1, 2, a quality is achieved which is nearly unchanged relative to the quality value Q1 for the first coil 1.

What is claimed is:

1. A circuit arrangement comprising:
   a first coil including a first inductor and a first ohmic resistor having a first quality value Q1; and
   a second coil which is serially connected to the first coil, the second coil including a second inductor and a second ohmic resistor having a second quality value Q2;
   wherein the first and second coils are magnetically coupled together and are selected so that for a particular range of a system frequency f, the first quality value Q1 decreases as a temperature T increases and the second quality value Q2 increases as the temperature T increases.

2. The circuit arrangement according to claim 1, wherein the first ohmic resistor comprises a first coil conductor and the second ohmic resistor comprises a second coil conductor.

3. The circuit arrangement according to claim 2, wherein the first coil conductor consists of litz wire.

4. The circuit arrangement according to claim 2, wherein the second coil conductor consists of solid wire.

5. The circuit arrangement according to claim 2, wherein the first coil conductor consists of litz wire and the second coil conductor consists of solid wire.

6. The circuit arrangement according to claim 1, wherein the range of the system frequency f includes a predetermined system frequency $f_4$.

* * * * *